United States Patent
Cheng et al.

(10) Patent No.: US 6,884,744 B2
(45) Date of Patent: Apr. 26, 2005

(54) ZEOLITE BASED CATALYST OF ULTRA-HIGH KINETIC CONVERSION ACTIVITY

(75) Inventors: Wu-Cheng Cheng, Ellicott City, MD (US); Philip S. Deitz, Baltimore, MD (US); Xinjin Zhao, Woodbine, MD (US)

(73) Assignee: W. R. Grace & Co.-Conn., Columbia, MD (US)

( * ) Notice: Subject to any disclaimer, the term of this patent is extended or adjusted under 35 U.S.C. 154(b) by 0 days.

(21) Appl. No.: 09/833,603

(22) Filed: Apr. 13, 2001

(65) Prior Publication Data

US 2003/0013601 A1 Jan. 16, 2003

(51) Int. Cl.$^7$ .............................. B01J 29/06; B01J 29/08
(52) U.S. Cl. .............................. 502/79; 502/64; 502/65; 502/73
(58) Field of Search .............................. 502/60, 64, 65, 502/73, 79

(56) References Cited

U.S. PATENT DOCUMENTS

| | | | |
|---|---|---|---|
| 3,293,192 A | 12/1966 | Maher et al. | 252/430 |
| 3,402,996 A | 9/1968 | Maher et al. | 23/112 |
| 3,607,043 A | 9/1971 | McDaniel et al. | 23/111 |
| 3,676,368 A | 7/1972 | Scherzer et al. | 252/455 Z |
| 3,867,279 A | 2/1975 | Young | 208/114 |
| 4,442,223 A | * 4/1984 | Chester et al. | 208/111.15 |
| 4,632,749 A | * 12/1986 | Hilfman | 208/120.01 |
| 4,767,734 A | * 8/1988 | Ward | 502/64 |
| 4,918,036 A | * 4/1990 | Rheaume et al. | 502/217 |
| 5,055,437 A | * 10/1991 | Herbst et al. | 502/61 |
| 5,079,202 A | * 1/1992 | Kumar et al. | 502/243 |
| 5,120,693 A | * 6/1992 | Connolly et al. | 502/64 |
| 5,308,814 A | 5/1994 | Kukes et al. | 502/66 |
| 5,366,948 A | 11/1994 | Absil et al. | 502/68 |
| 5,788,834 A | * 8/1998 | Lapinski | 208/113 |
| 6,022,471 A | * 2/2000 | Wachter et al. | 208/120.01 |

FOREIGN PATENT DOCUMENTS

| | | | |
|---|---|---|---|
| EP | 550270 | 9/1996 | C10G/11/05 |
| EP | 837118 | 4/1998 | C10G/11/05 |
| WO | WO 96/09889 | 4/1996 | B01J/23/10 |
| WO | WO 98/41595 | 9/1998 | C10G/11/05 |

* cited by examiner

Primary Examiner—Christina Johnson
(74) Attorney, Agent, or Firm—Howard J. Troffkin

(57) ABSTRACT

A catalyst useful in cracking of hydrocarbon feedstock comprising particulate material composed of at least 70 weight percent zeolite and the remainder substantially composed of silica sol, alumina sol or mixtures thereof; wherein the particulate material has a kinetic conversion activity of at least about 3; and compositions for fluid catalytic cracking of petroleum feedstock comprising said catalyst and a second particulate material having a kinetic conversion activity of less than 3 wherein said catalyst composition having a kinetic conversion activity of at least about 2.

24 Claims, No Drawings

ZEOLITE BASED CATALYST OF ULTRA-HIGH KINETIC CONVERSION ACTIVITY

BACKGROUND OF THE INVENTION

Catalytic cracking is a commercial process applied by the petroleum refining industry on a very large scale. A large percentage of the refinery gasoline blending pool in the United States is produced using fluid catalytic cracking (FCC) processes. In this process, heavy hydrocarbon fractions (feedstock) are converted into lighter, more desired products by reactions taking place in the presence of a catalyst. The majority of this conversion occurs in the vapor phase within the fluid catalytic cracking unit (FCCU) which contains particles of the catalyst in a moving or ebullating state. The feedstock is, thereby, converted into gasoline, distillates and other liquid products as well as lighter gaseous products of four or less carbon atoms per molecule.

The three characteristic process zones of the FCC process are composed of:
i) a cracking step in which the hydrocarbon feedstock is endothermically converted into the desired lighter products. This occurs by contacting hot, active particles of catalyst, normally without added hydrogen, at pressures of up to about 50 psig and elevated temperatures of up to about 650° C. The catalyst must be of sufficient particle size and strength as to not provide excessive fines which can contaminate the product stream and/or the atmosphere. At the same time, the catalyst particles must be small enough to be capable of being in a fluidized state;
ii) a stripping step in which hydrocarbons adsorbed on the catalyst are removed; and
iii) a regeneration step in which the undersirable carbonaceous residue (coke) remaining on the catalyst is removed by subjecting the catalyst to sufficiently high temperatures to burn off coke from the catalyst. The hot regenerated catalyst is then reused in the cracking step to treat additional feed and to provide the elevated temperature maintained in the cracking zone.

The cyclical processes of cracking and regeneration steps, wherein the catalyst is subjected to high flow rates and temperatures, have a tendency to physically break down the catalyst into smaller particle sizes called fines. These fines detract from the catalysts activity and processability. Thus, as part of an FCC process, the fines are removed from the FCCU in a continuous manner.

Cracking catalysts used in FCC processes are porous powders composed of oxides of silica and alumina. When aerated with gas, the powder attains a fluid-like state that permits its circulation through the various FCC process zones. The major active components of FCC catalysts of concern here are zeolites. The term "zeolite", as used herein and in the appended claims, refers to synthetic and natural faujasites.

Natural and synthetic zeolites can not be directly used in FCC units as they are of ultra-small particle size which rapidly produce a large amount of fines of 0–20 micron diameter. As stated above, the presence of large amounts of such fines can not be tolerated as they will pollute the atmosphere or require high capacity cyclones and electrostatic precipitators to prevent them from becoming airborne. Further, those skilled in the art appreciate the concept that excessive generation of catalyst fines causes increased addition of fresh particles of desired size and dilution of catalytically viable particle. Thus, the process will reflect increased cost due to attrition of catalyst as well as increased cost in attaining proper removal of fines and/or lower activity of the catalyst composition.

More specifically, natural and synthetic zeolites are powders that have an average particle size of about 20 to about 40 microns and, therefore, are not deemed useful as an FCC catalyst. The specific particle size distribution of formed zeolite may be regulated by controlling the initial spray drying of the formed catalyst. However, in almost all instances the physical integrity (attrition resistance) of the material is poor and, therefore is easily converted into fines within the FCCU.

In view of the above, formed zeolite is conventionally agglomerated into particles having an average diameter of from about 50 to about 150 microns, with from about 60 to 100 microns being preferred. The agglomerated particles deemed useful for FCC processes are formed from a mixture of a zeolite along with additional active matrix material to enhance the particle's conversion activity as well as inactive material and a binder. These components are conventionally combined and formed into particulate material of the desired particle size. Typically, FCC catalysts are composed of from 20 to 40 parts by weight of a zeolite, 0 to 30 parts by weight of an active matrix material, 20 to 50 parts by weight of an inactive matrix material and from 10 to 25 parts by weight of a binder.

Because of the constraint of the particle size, conventional catalyst particles provide only a limited room for those components (e.g., zeolite and alumina) that provide the majority of the catalyst's cracking activity or kinetic catalyst activity. It has been believed that the inclusion of large amounts of inactive matrix materials (e.g. clays) are required to provide a suitable particulate material for use in an FCCU.

In cracking of hydrocarbons, it is desired to maximize output of desirable products while minimizing costs, including those attributable to catalyst handling. The scale of cracking is such that even what appears to be modest improvement in some property may have a large effect on a refinery's profitability.

While modern cracking catalysts have made significant strides to improve their catalytic performance and their physical properties, there is still the need to provide catalysts which can exhibit enhances kinetic catalyst activity while having good physical properties which make them resistant to attrition and production of fines.

It would be highly desired to provide an FCC catalyst that provides high kinetic conversion activity and are hard particulate material resistant to formation of fines.

SUMMARY OF THE INVENTION

The present invention is directed to a catalyst suitable for use in FCC processes that exhibit high catalytic activity, as shown by its high kinetic catalytic activity.

The present invention is further directed to a catalyst of high kinetic catalytic activity and high attrition resistance suitable for use in FCC processes. Thus, the present catalyst exhibits low production of fines therein.

The present invention is also directed to catalysts useful in FCCU of short contact time risers that require catalysts of high activity.

Still further, the present invention is directed to catalyst composition formed from i) particulate catalyst material of the subject invention, in combination with ii) particulate material having substantially no or low catalytic cracking activity, such as particulates useful for sulfur and/or nitrogen oxide removal from the feedstock being processed and/or materials capable of enhancing propylene selectivity, isomerization and/or bottom cracking and/or iii) particulate material having low conversion activity.

Specifically the present invention is directed to particulate material composed of at least 70 weight percent zeolite, preferably a Y type zeolite and the remainder being selected from a silica sol or an alumina sol.

DETAILED DESCRIPTION

The present invention is directed to a catalyst particulate material containing greater than 70, preferably greater than 80 weight percent (e.g., 75 to 90 or 80 to 85 weight percent) zeolite and the remainder being substantially composed of alumina sol or silica sol or combinations thereof. This catalyst particulate material has been found useful in converting petroleum hydrocarbon feedstock in an FCCU into desired products. This catalyst may be used alone or, preferably, with other separate particulate material having substantially no or low kinetic conversion activity with respect to the feedstock.

The present FCC cracking catalyst is based on the presence of very high amounts of zeolite (faujasite) in each of the catalyst particles. Faujasite is a crystalline three-dimensional aluminosilicate of the zeolite mineral group that has ion-exchange capacity. Faujasite is known to occur naturally but, due to its scarcity it is formed synthetically in the sodium form by crystallization of sodium aluminate and sodium silicate. The crystalline structural units of faujasite are tetrahedra, made up of one silicon and four oxygen atoms and one aluminum atom and four oxygen atoms. Tetrahedra form truncated octahedra that unite by means of hexagonal prisms to form faujasite. Each repeating unit of faujasite is a "unit cell" (UC). The junctures between the octohedran and hexagonal prisms, surrounding and defining each opening, are oxygen atoms at the vertices of either the silica or alumina tetrahedra. Thus, twelve oxygen atoms define each opening of the unit cell and these openings are of about 7 to 9 Å.

As stated above, fluid cracking catalysts are fine porous powdery materials composed of the oxides of silicon and aluminum. In certain instances other elements (e.g. rare earth metal atoms) may also be present in small amounts. Under FCCU reactor conditions carbocation reactions occur to cause molecular size reduction of petroleum hydrocarbons feedstock introduced into the reactor. When aerated with gas, the catalytic powdery material attains a fluid-like state that allows it to behave like a liquid. This property permits the catalyst to have enhanced contact with the hydrocarbon feedstock and to be circulated between the reactor and the other units of the overall process (e.g., regenerator). Hence, the term "fluid" has been adopted by the industry to describe this material.

"Fresh" fluid cracking catalyst is catalyst composition, as manufactured and sold.

"Equilibrium" fluid cracking catalyst is the inventory of circulating catalyst composition in an FCC unit once it has reached a steady state within the environment of the FCCU.

"Simulated Equilibrium" refers to fluid cracking catalyst that has been steam treated in the laboratory to simulate an equilibrium cracking catalyst of an FCCU. One such laboratory procedure for attaining simulated equilibrium is to steam fresh catalyst at 1500° F. (816° C.) for 4 hours under one atmosphere of steam. Another deactivation procedure is called CPS (cyclic propylene steam) deactivation which use propylene and air to simulate the REDOX process in addition to the steaming deactivation effect (See American Chemical Society Symposium Series, No. 634, Page 171–183 (1996).

As fresh catalyst equilibrates within an FCCU, it is exposed to various conditions, such as the deposition of feedstock contaminants and severe regeneration operating conditions. Thus, equilibrium catalysts may contain high levels of metal contaminants, exhibit somewhat lower activity, have lower aluminum atom content in the zeolite framework and have different physical properties than fresh catalyst. In normal operation, refiners withdraw small amount of the equilibrium catalyst from the regenerators and replace it with fresh catalyst to control the quality (e.g., its activity and metal content) of the circulating catalyst inventory.

Kinetic conversion of a fluid cracking catalyst at a simulated equilibrium state is measured by the percentage conversion of heavy hydrocarbon feedstock (i.e. the percentage of product formed from a unit of feedstock wherein product is coke and formed material having a boiling point of up to 430° F. (221° C.)) divided by 100 minus the percentage conversion of the heavy feedstock, as defined above.

"Kinetic conversion activity" refers to kinetic conversion measured in accordance with ASTM microactivity test (ASTM-5154) at a catalyst to oil weight ratio of 4 with a typical gas oil feed, such as described in Table 1 below.

Although any zeolite suitable for hydrocarbon catalytic cracking can be used in the present invention, the preferred types of zeolites found useful herein are of the X and Y zeolite types, with the Y types being more preferred and certain modified Y zeolites (e.g. REY and CREY) being most preferred. The Standard Y is formed in the manner described above and can be exchanged to remove a portion of the sodium by hydrogen (HY) and/or by exchange with rare earth metal ions (REY). In addition, an ultrastable Y zeolite (USY type) is formed by additional manufacturing techniques of dealumination that increase the framework silicon/aluminum atomic ratio of the standard Y or REY zeolite. This is achieved by either steam calcination (e.g., CREY type) or chemical treatment. Each of the various types of zeolites can be used in forming the zeolite catalyst of the present invention.

Both Standard Y an USY types of zeolites can be treated by ion exchange to replace the sodium atoms present with other cations, usually as mixtures of rare earth metals such as cerium, lanthanum, neodyminum, naturally occurring rare earths and mixtures thereof to provide REY and REUSY grades, respectively. These zeolites may be further treated to calcination to provide CREY and CREUSY types of material. Alternately, MgUSY, ZnUSY and MnUSY may be used. These zeolites can be formed by using the metal oxide of Mg, Zn or Mn or mixtures thereof in the same manner as described above with respect to the formation of USY except that magnesium oxide, zinc oxide or manganese oxide is used in lieu of the rare earth metal oxide used to form REUSY The preferred zeolites are USY, REY, REUSY, CREY and CREUSY with the rare earth grades (e.g., CREY) being most preferred. The preparation of these zeolites is described in U.S. Pat. No. 3,692,665 (thermal stabilized); U.S. Pat. No. 3,293,192 (USY); U.S. Pat. No. 3,402,996 (CREY); U.S. Pat. Nos. 3,607,043 and 3,676,368 (REY and REUSY), which teachings are incorporated herein in their entirety by reference.

The unit cell size (UCS) of zeolite can be measured by x-ray analysis under the procedure of ASTM D3942. The Y-type zeolite found useful in the present catalyst composition has an equilibrium catalyst unit cell size of at least 24.25 Å, preferably from 24.30 to 24.50 Å and more preferably from 24.30 to 24.38 Å. When an equilibrium catalyst is subjected to x-ray analysis, such procedure only measures the UCS of the crystalline zeolite contained therein.

The zeolite FCC particles of the present invention are further composed of a sol selected from alumina sol, silica sol, or a mixture thereof, preferably an alumina sol.

The preparation of sols useful in the present composition are well known to those skilled in the art.

For example an alumina sol binder useful in the practice of the present invention comprises a mixture of aluminum hydroxide and aluminum trichloride which roughly corresponds to the following formula:

x Al(OH)$_3$.AlCl$_3$ wherein x ranges from about 4.5 to 7.0.

The alumina sol possessing the above general formula is prepared by reacting an aluminum metal with an aqueous solution of hydrochloric acid to form aluminum trichloride, according to the general reaction 2Al+6 HCl→2 AlCl$_3$+3H$_2$. The aluminum chloride subsequently reacts with water in amounts which will yield a mixture of aluminum hydroxide and aluminum chloride in the above-identified ratios. In a preferred method for preparing the present alumina sol, an aqueous solution of hydrochloric acid and aluminum metal is reacted at a temperature of from about 175° to 220° F. for a time ranging from about 6–24 hours. The aqueous HCl solution preferably contains from about 0.5 to 1.5 mole HCl per liter. From about 0.35 to 0.54 moles of HCl are reacted with each atom of aluminum metal. The reaction yields alumina sol which is colorless to a slightly bluish, colored liquid and which is readily soluble in water. In general, aqueous solutions of sol are prepared which contain from about 15 to 30% by weight of alumina calculated as Al$_2$O$_3$.

Silica sols useful in the present invention are prepared by the rapid addition of a strong acid (e.g. nitric or sulfuric acid) alone or with a buffering agent (e.g., alum) to an aqueous solution of an alkali metal silicate (e.g., sodium silicate). The silicate is normally in a concentration of from about 8 to 28, preferably from 10 to 25, and more preferably from 10 to 20 weight percent of the solution being treated. The resultant acidified silica sol should have a pH of less than about 3 (e.g., 1 to 3) and more preferably less than about 2.5 (e.g., 1.5 to 2.5). Alternately, a buffered silica sol may be formed by treating the silicate with a mixture of sulfuric acid and alum (aluminum sulfate). This mixtures is normally added to the sodium silicate solution as an aqueous solution in amounts to provide a resultant sol having a pH in the range of from 1 to 3, preferably less than about 2.5. The buffered silica hydrosol contains between 1 and 10 wt. percent alumina based on the total solids of the resultant sol. The resultant silica sol, contains from 15 to 40 weight percent silica and typically from 1 to 10 weight percent alumina based on solid content of the hydrosol.

Such buffered silica sols do not rapidly convert from a sol to a hydrogel during mixing but, instead, has been found to have a delayed gel time that is sufficient for the sol to be further processed to provide a zeolite hydrogel particulate product of the present invention. The term "silica gel", as used herein and in the appended claims, shall refer collectively to the materials known as silica hydrogel, silica xerogel and silica aerogel unless otherwise specifically stated. Silica hydrogel, also known as silica aquagel, is a silica gel formed in water which has its pores filled with water. A xerogel is a hydrogel with the water removed. An aerogel is a type of xerogel from which the liquid has been removed in such a way as to minimize any collapse or change in the structure as the water is removed.

The preferred sol to be used in forming the high-content zeolite catalyst of the present invention is alumina sol.

The present zeolite catalyst of high kinetic conversion activity may be formed by combining a zeolite of choice, preferably a Y-type zeolite and more preferably a rare-earth Y type zeolite, such as REY or CREY zeolite, with one of the sols described above, preferably, an alumina sol. The zeolite may be either introduced to a solution of the sol precursor. For example, the zeolite may be mixed with an aqueous slurry of aluminum metal powder prior to the introduction of hydrochloric acid to provide an alumina sol material having the zeolite contained therein. Alternately, the zeolite of choice may be introduced into a prior formed alumina sol at temperatures of from about ambient to 100° C., preferably from ambient to 40° C. and under high shear mixing conditions.

Similarly, the zeolite may be first mixed with an aqueous solution of an alkali metal silicate (e.g., sodium silicate) prior to acidification to result in a silica sol. When a zeolite having high sodium content is used the acid should be sufficient to have a resultant pH of 2 to 3 while when a reduced soda zeolite is used, the resultant pH is 1.5 to 2. Alternately, the zeolite may be introduced into a prior formed silica sol having a pH of 1 to 3.0. This latter mode is preferred provided the zeolite is introduced rapidly and under high shear forces to cause rapid distribution of the zeolite throughout the silica sol prior to its conversion into a silica gel.

In either instance, the zeolite and sol may be mixed together under a wide range of temperatures, typically from about ambient to about 50° C., preferably from about 20 to 35° C.

In the case of a zeolite-silica sol mixture, the composite maybe washed with water to remove undesired salts (e.g., sodium salts) in conventional manners.

The amount of zeolite to silica or alumina (of the respective sol) should be sufficient to provide a substantially uniform dispersion having at least about 70 weight percent, preferably at least about 80 weight percent zeolite in the sol based on the total solid content of the mixture. The resultant mixture is a plastic or jelly-like composition.

Alternately, the mixture can be combined with additional water, optionally passed through a wet mill, and then passed through a spray dryer apparatus to provide microspheres having a particle size of from about 50 to 150 microns, with from 50 to 90 microns average diameter being preferred. The conditions to achieve this particulate material will depend upon the particular sol used, the weight percent of the zeolite and the sol and the temperature at which the spray drying is conducted.

Methods of milling, spray drying and particle recovery that are suitable as a catalyst are known in the art and described in U.S. Pat. Nos. 3,444,097 and 5,366,948 as well as WO 98/41595, which teachings are incorporated herein in their entirety by reference.

Subsequent to the formation of the catalyst particles, the particles are dried at a temperature of from about 90° C. to 150° C. and finally calcined at temperatures ranging from 350° C. to 600° C., preferably from about 450° C. to 550° C.

The catalyst product of the present invention exhibits a combination of desired properties not attained by prior conventional catalyst materials. The present catalyst can be readily formed into particulate product suitable for use in FCC systems. The present product has very high kinetic conversion activity with respect to hydrocarbon feedstock conventionally used in such processes. Further the present catalyst product is a dense, attrition resistant material which exhibits both high surface area and pore volume (H$_2$O).

The present catalyst product exhibits high kinetic conversion activity of at least about 3, normally between about 3.5 to about 5.5 with from 4 to 5 readily attained. Such high conversion activity provides a means for more efficiently and effectively converting feedstock to desired materials having boiling points of up to about 220° C.

The exact activity will depend on the particular zeolite used to form the present catalyst product. As stated above, it is preferred to use a Y-type of zeolite, more preferably rare earth metal containing Y-type zeolites, as the zeolite component of the present catalyst product. Such activity is increased on a simulated equilibrium Y-type zeolite containing cracking catalyst, that is a catalyst that has undergone steam treatment at 1500° F. (815° C.) for a 4 hour period under one atmosphere of steam.

The present catalyst product is a dense, attrition resistant product which does not readily convert into undesired fines in an FCCU. The present product exhibits Davison Attrition Index values of 20 or less, with values of from about 5 to 15 (e.g., 8–13) being readily achieved. Davison Attrition Index is a conventional method for determining the resistance of a particulate material to convert into fines (i.e., particulate having a particle size of from 0 to 20 microns). To determine the Davison Attrition Index (DI) of the catalyst, 7.0 cc of sample catalyst is screened to remove particles in the 0 to 20 micron range. Those particles are then contacted in a hardened steel jet cup having a precision bored orifice through which an air jet humidified (60%) air is passed at 21 liter/minute for 1 hour. The DI is defined as the present of 0–20 micron fines generated during the test relative to the amount of >20 micron material initially present, i.e., the formula below.

$$DI = 100 \times \frac{\text{wt. \% of 0-20 micron material formed during test}}{\text{wt. of original 20 microns or greater material before test}}$$

The lower the DI number, the more attrition resistant is the catalyst. Commercially acceptable attrition resistance is indicated by a DI of less than about 20, and preferably less than 10.

The present catalyst product has high surface area and high pore volume. Surface area of greater than 250, preferably greater than 500 m$^2$/g (Brunauer, Emmett and Teller, JACS 60, pp.209–319 (1939)), with surface areas of greater than 600 being readily attained. The H$_2$O pore volume of the present catalyst product is greater than 0.32 cc/g H$_2$O pore volume (PV).

As stated above, the present catalyst product has been found useful in the conversion of hydrocarbon feedstock to products of lower molecular weights (e.g., cracking). For the purposes of this invention, "hydrocarbon feedstock" not only includes organic compounds containing carbon and hydrogen atoms, but also includes hydrocarbons comprising oxygen, nitrogen and sulfur heteroatoms. The feedstocks can be those having a wide range of boiling temperatures, e.g., naphtha, distillate, vacuum gas oil and residual oil. Such feedstocks also include those for making heterocyclic compounds such as pyridine.

The invention is particularly suitable for fluidized processes, e.g., in which catalyst attrition is a factor. The invention is especially suitable for fluidized catalytic cracking of a hydrocarbon feed to a mixture of products comprising gasoline, alkylate, potential alkylate, and lower olefins, in the presence of conventional cracking catalyst under catalytic cracking conditions.

Typical hydrocarbons, i.e., feedstock, to such processes may include in whole or in part, a gas oil (e.g., light, medium, or heavy gas oil) having an initial boiling point about 204° C., a 50% point of at least about 260° C., and an end point of at least about 315° C. The feedstock may also include deep cut gas oil, vacuum gas oil, thermal oil, residual oil, cycle stock, whole top crude, tar sand oil, shale oil, synthetic fuel, heavy hydrocarbon fractions derived from the destructive hydrogenation of coal, tar, pitches, asphalts, hydrotreated feedstocks derived from any of the foregoing, and the like. As will be recognized, the distillation of higher boiling petroleum fractions above about 400° C. must be carried out under vacuum in order to avoid thermal cracking. The boiling temperatures utilized herein are expressed in terms of convenience of the boiling point corrected to atmospheric pressure. Resids or deeper cut gas oils having an end point of up to about 700° C., even with high metals contents, can also be cracked using the invention.

Catalytic cracking units are generally operated at temperatures from about 400° C. to about 650° C., usually from about 450° C. to about 600° C., and under reduced, atmospheric, or superatmospheric pressure, usually from about atmospheric to about 5 atmospheres.

The catalyst product of the present invention may be used as substantially the sole component of the catalyst composition with respect to the above processes or, alternately and preferably, in combination with other independent particulate components in an FCCU to maintain high activity to the system. For example, the present catalyst product can be used in combination with known combustion promoters, sulfur and/or nitrogen reduction agents, metal (Ni and/or Vanadium) contaminant reduction agents and the like and mixtures thereof. Such additives exhibit substantially no kinetic conversion activity. Conventionally, a refiner must limit the amount of these "inert" additives to maintain a system that still exhibits desired activity to cracking. The dilution of activity of a catalyst by substantially inert diluent is generally considered to be substantially linear and based on the weight ratio of the components. It is thus seen that catalyst systems using conventional FCC catalysts are normally limited to small amounts (e.g., less than 5 weight percent) of inert additives. Such small amounts do not always provide the desired result (e.g. reduction of sulfur nitrogen compounds and/or metals.).

In contrast, catalytic compositions based on the present catalyst product can include large amounts, such as at least 30 weight percent and even greater than 50 weight percent, of particles of inert additives while still maintaining a high (e.g., at least about 2, such as from 2 to 3) kinetic conversion activity for the overall catalyst composition. Thus, the FCC catalyst products of the present invention are particularly useful in forming cost effective catalyst compositions of treating feedstocks which contain high levels of contaminating metals (Ni and V), sulfur and/or nitrogen. The physical blend of catalyst and inert diluent additives may contain 30, even 50 and in some instances greater than 60 weight percent additive.

The present catalyst product may also be used in combination with conventional FCC catalysts (e.g., compositions of a zeolite or ZSM-type active component, active matrix, clay and a binder matrix). For example, small amounts of the present catalyst product may be introduced into the FCCU to enhance catalyst systems having conversion activity of less than 3, normally less than 2.5 (e.g., 2.0–2.5) circulating through the FCCU.

The following examples are presented for illustrative purposes and are not meant to be a limitation on the invention, as defined by the appended claims. All parts and percentages are by weight unless otherwise indicated.

Further, any range of numbers recited in the present specification or claims, such as that representing a particular set of properties, units of measure, conditions physical states or percentages, is intended to literally incorporate expressly herein by reference or otherwise, any number falling within such range, including any subset of numbers within any range so recited.

TABLE 1

Feed Properties

|  | Typical |
| --- | --- |
| API | 15–35 |
| Sulfur, wt % | 0.01–4 |
| Total Nitrogen, ppm | 0.02–0.3 |
| Basic Nitrogen, ppm | 0.008–0.1 |
| Conradson Carbon, wt. % | 0–6 |
| K Factor | 11–12.5 |
| Distillation, 10%, ° C. | 145–315 |
| Distillation, 50%, ° C. | 315–485 |
| Distillation, 90%, ° C. | 430–650 |

EXAMPLE 1

70% REY+30% Alumina Sol Binder

A 6000 parts batch was prepared by adding 8,571 parts (1,800 parts alumina basis) of alumina-sol to 13,125 parts (4200 grams silica-alumina basis) of REY zeolite slurry. The mixture was wet milled to reduce particle size to an average particle size of about 1–2 microns and spray dried.

The spray dried product was then calcined to set the binder and then washed using ammonium sulfate solution to remove soda.

The resulting catalyst had a DI=4, a pore volume (PI) of 0.36 g/cc and an average bulk density of 0.69 grams/cc.

EXAMPLE 2

72.5% REY +27.5% Alumina Sol Binder

A 6000 parts batch was prepared by adding 7,857 parts (1,650 parts alumina basis) of alumina-sol to 13,594 parts (4,350 parts silica-alumina basis) of REY zeolite slurry. The mixture was wet milled to reduce particle size to an average particle size of 1–2 microns and spray dried.

The spray dried product was then calcined to set the binder and then washed using ammonium sulfate solution to remove soda.

The resulting catalyst had a DI=5, a PI of 0.43 and an average bulk density of 0.66 grams/cc.

EXAMPLE 3

75% REY+25% Alumina Sol Binder

A 6000 parts batch was prepared by adding 7,142 parts (1,500 partss alumina basis) of alumina-sol to 14,063 parts (4,500 parts silica-alumina basis) of REY zeolite slurry. The mixture was wet milled to reduce particle size and spray dried.

The spray dried product was then calcined to set the binder and then washed using ammonium sulfate solution to remove soda.

The resulting catalyst had a DI=15, a PI of 0.46 and an average bulk density of 0.62 grams/cc.

EXAMPLE 4

75% USY+25% % Alumina Sol Binder

A 6000 parts batch was prepared by adding 7,143 parts (1,500 parts alumina basis) of alumina I-sol to 14,516 parts (4,500 parts silica-alumina basis) of USY zeolite slurry. The mixture was wet milled to reduce particle size and spray dried.

The spray dried product was then calcined to set the binder and then washed using ammonium sulfate solution to remove soda.

The resulting catalyst had a DI=2, a PI of 0.33 and an average bulk density of 0.70 grams/cc.

EXAMPLE 5

75% NaY+25% Silica-sol Binder

An 8000 parts batch was prepared by adding 5,506 parts (1,500 parts silica basis) of sodium silicate solution to 14,063 parts (4,500 parts silica-alumina basis) of wet milled NaY zeolite slurry. The slurry was mixed with 20% sulfuric acid solution in a high shear mix pump. Sufficient acid was used in order to create an acidic silica-sol and to acidify the zeolite at the same time to cause the resulting sol-slurry to have a gel time of 30 min. and a pH of <3.5. The sol-slurry was spray dried before gelling occurred. The spray dried product was then washed using ammonium sulfate solution to remove soda and dried at 250° F. The resulting catalyst had a DI=9, a PI of 0.58 and an average bulk density of 0.56 grams/cc.

EXAMPLE 6

75% USY+25% Silica-sol Binder

An 8000 parts batch was prepared by adding 5,506 parts (1,500 parts silica basis) of sodium silicate solution to 15,106 parts (4,500 parts silica-alumina basis) of wet milled USY zeolite slurry. The slurry was mixed with 20% sulfuric acid solution in a high shear mix pump. Sufficient acid was used in order to create an acidic silica-sol and to acidify the zeolite at the same time to cause the sol-slurry to have a gel time of 30 min. and a pH<3.5. The sol-slurry was spray dried before gelling occurred. The spray dried product was then washed using ammonium sulfate solution to remove soda and dried at 250° F. The resulting catalyst had a DI=6, a PI of 0.50 and an average bulk density of 0.56 grams/cc.

EXAMPLE 7

75% REY+25% Silica-sol Binder

An 8000 parts batch was prepared by adding 5,506 parts as is (1,500 parts silica basis) of sodium silicate solution to 15,614 parts as is (4,500 parts silica-alumina basis) of drais milled REY zeolite slurry. The mixture was run off against 20% sulfuric acid solution in a high shear mix pump. Sufficient acid was used in order to create an acidic silica-sol and to acidify the zeolite at the same time. The resulting sol-slurry had a gel time of 30 min. and a pH<3.5. The sol-slurry was spray dried before gelling occurred. The spray dried product was then washed using ammonium sulfate solution to remove soda and oven dried. The resulting catalyst had a DI=9 and an average bulk density of 0.57 grams/cc.

What is claimed is:

1. A catalyst suitable for use in hydrocarbon feedstock cracking comprising particles consisting essentially of:
   i) at least 75 weight percent of zeolite selected from USY, REY, REUSY, CREY, CREUSY or mixtures thereof; and
   ii) remainder substantially composed of an alumina sol;
   said catalyst is in the form of particulates having an average diameter of from about 50 to about 150 microns; has a kinetic conversion activity of at least about 3; and a Davison Attrition Index of less than about 20.

2. The catalyst of claim 1 wherein the catalyst has a surface area of at least about 500 $m^2/g$.

3. The catalyst of claim 2 wherein the catalyst has an average bulk density of at least about 0.6 g/cc.

4. The catalyst of claim 3 wherein the catalyst particles have a $H_2O$ pore volume of greater than 0.32 cc/g.

5. The catalyst of claim 1 wherein the zeolite at least 80 weight percent of said particles.

6. The catalyst of claim 2 wherein the zeolite at least 80 weight percent of said particles.

7. The catalyst of claim 3 the zeolite at least 80 weight percent of said particles.

8. The catalyst of claim 4 the zeolite at least 80 weight percent of said particles.

9. The catalyst of claim 1, 2, 3, 4 or 5 wherein the zeolite is CREY zeolite.

10. The catalyst of claim 1, 2, 3, 4 or 5 wherein the zeolite is REUSY zeolite.

11. The catalyst of claim 1, 2, 3 or 4 wherein the zeolite is present in from 75 to 90 weight percent of said particles.

12. A catalyst composition useful in cracking of hydrocarbon feedstock comprising:
    a) first particulate material composed of at least 75 weight percent of zeolite selected from USY, REY, REUSY, CREY, CREUSY type zeolite or mixtures thereof; and the remainder substantially composed of an alumina sol; wherein said first particulate material has an average diameter of from about 50 to about 150 microns; has a kinetic conversion activity of at least about 3; and a Davison Attrition Index of less than about 20; and
    b) second particulate material having a kinetic conversion activity of less than 3; said catalyst composition having a kinetic conversion activity of at least about 2 to about 3.

13. The composition of claim 12 wherein the first particulate material has a surface area of at least about 500 $m^2/g$ and a $H_2O$ pore volume of greater than 0.32 cc/g.

14. The composition of claim 13 wherein the first particulate material has an average bulk density of at least about 0.6 g/cc.

15. The composition of claim 13, or 14 wherein the zeolite of the first particulate material is a CREY zeolite.

16. The composition of claim 12, 13, or 14 wherein the zeolite of the first particulate material is a REUSY zeolite.

17. The composition of claim 12, 13 or 14 wherein the second particulate material has a kinetic conversion activity of less than 1.

18. The composition of claim 17 wherein the second particulate material is an FCC additive selected from combustion promoters, nickel passivators, vanadium passivators, sulfur reduction agent, nitrogen reduction agents or mixtures thereof.

19. The composition of claim 17 wherein the first particle has zeolite in at least 80 weight percent of said particles.

20. The composition of claim 15 therein the composition of claim 17 wherein the second particulate material is an FCC additive selected from combustion promoters, nickel passivators, vanadium passivators, sulfur reduction agents nitrogen reduction agents or mixtures thereof.

21. The composition of claim 16 wherein the composition of claim 17 wherein the second particulate material is an FCC additive selected from combustion promoters, nickel passivators, vanadium passivators, sulfur reduction agents, nitrogen reduction agents or mixtures thereof.

22. The composition of claim 15 wherein the composition of claim 17 wherein the first particle has zeolite in at least 80 weight percent of said particles.

23. The composition of claim 15 wherein the composition of claim 17 wherein the first particle has zeolite in at least 80 weight percent of said particles.

24. The composition of claim 16 wherein the composition of claim 17 wherein the first particle has zeolite in at least 80 weight percent of said particles.

* * * * *